(12) United States Patent
Fukuo et al.

(10) Patent No.: US 11,828,607 B2
(45) Date of Patent: Nov. 28, 2023

(54) GUIDANCE SYSTEM

(71) Applicant: KOBELCO CONSTRUCTION MACHINERY CO., LTD., Hiroshima (JP)

(72) Inventors: Nobuhiro Fukuo, Hiroshima (JP); Yoichiro Yamazaki, Hiroshima (JP); Koji Yamashita, Hiroshima (JP); Yusuke Kamimura, Hiroshima (JP); Shingo Sekiguchi, Tokyo (JP); Takayuki Iino, Tokyo (JP); Hiroshi Kobayashi, Tokyo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 0 days.

(21) Appl. No.: 17/783,116

(22) PCT Filed: Oct. 6, 2020

(86) PCT No.: PCT/JP2020/037801
§ 371 (c)(1),
(2) Date: Jun. 7, 2022

(87) PCT Pub. No.: WO2021/131222
PCT Pub. Date: Jul. 1, 2021

(65) Prior Publication Data
US 2022/0412751 A1    Dec. 29, 2022

(30) Foreign Application Priority Data

Dec. 23, 2019  (JP) ................................. 2019-231822

(51) Int. Cl.
*G01C 21/00* (2006.01)
*G01C 21/34* (2006.01)
(Continued)

(52) U.S. Cl.
CPC .......... *G01C 21/3407* (2013.01); *B66C 13/46* (2013.01); *E01C 19/004* (2013.01); *E01C 19/52* (2013.01); *G06T 7/62* (2017.01)

(58) Field of Classification Search
CPC ... G01C 21/3407; B66C 13/46; E01C 19/004; E01C 19/52; E01C 11/22; G06T 7/62; E02F 3/404; E02F 5/10; E02F 9/264
See application file for complete search history.

(56) References Cited

U.S. PATENT DOCUMENTS

| | | | |
|---|---|---|---|
| 11,694,452 B1 * | 7/2023 | McCulley | G06T 7/70 356/4.01 |
| 2023/0066200 A1 * | 3/2023 | Sugita | G06T 7/62 |

FOREIGN PATENT DOCUMENTS

| | | |
|---|---|---|
| CN | 103562745 A | 2/2014 |
| CN | 110054089 A | 7/2019 |

(Continued)

OTHER PUBLICATIONS

Extended European Search Report dated Dec. 16, 2022, in corresponding European Patent Application No. 20906774.3, 5 pages.
(Continued)

*Primary Examiner* — Ian Jen
(74) *Attorney, Agent, or Firm* — Oblon, McClelland, Maier & Neustadt, L.L.P.

(57) ABSTRACT

A memory stores, in advance, target line information indicating an arrangement target of an object to be conveyed and related to a target line denoted by at least one of a curve or a polyline. A controller is configured to: calculate, based on the target line information, target information which is at least one of information about a target coordinate of the object and information about a target direction of the object; calculate, based on the at least one of the coordinate of the object and the direction of the object detected by the detector, detection information which is comparable with the
(Continued)

target information; calculate a deviation of the detection information from the target information; and cause a display to display a moving direction of the object which allows the deviation to decrease.

8 Claims, 11 Drawing Sheets

(51) Int. Cl.
*B66C 13/46* (2006.01)
*E01C 19/00* (2006.01)
*G06T 7/62* (2017.01)
*E01C 19/52* (2006.01)

(56) References Cited

FOREIGN PATENT DOCUMENTS

| EP | 3 978 872 A1 | 4/2022 |
|----|--------------|--------|
| JP | 6-271275 A | 9/1994 |
| JP | 9-71387 A | 3/1997 |
| JP | 2017-25633 A | 2/2017 |
| TW | 201923500 A | 6/2019 |
| WO | WO 2015/059740 A1 | 4/2015 |

OTHER PUBLICATIONS

International Search Report dated Dec. 22, 2020 in PCT/JP2020/037801 filed Oct. 6, 2020, 2 pages.

* cited by examiner

GUIDANCE SYSTEM

TECHNICAL FIELD

The present invention relates to a technology of performing guidance for a moving direction of an object to be conveyed.

BACKGROUND ART

A road ancillary continuous structure, such as a U-shaped groove structure or a ditch structure, has been conventionally arranged by, first, providing a stake serving as an indication of an arrangement place, and then positioning the road ancillary continuous structure while aiming at the stake. However, there has been an increasing demand for arrangement of the structure with high accuracy and a smaller number of workers, specifically, for highly accurate arrangement of the structure without using the stake.

For instance, Patent Literature 1 discloses a technology of installing a road ancillary continuous structure without using a stake. Patent Literature 1 discloses a structural difference calculation step of actually measuring surface position data of a U-shaped groove structure at a total station by mounting a mobile station on the U-shaped groove structure, and causing a processor to compare structure surface position data with design data to thereby calculate a structural construction difference therebetween. The structural construction difference represents a deviation direction and a deviation distance from a correct position. The display device displays a moving direction and a moving distance to be corrected.

The conventional technology includes: comparing position data (a construction position of the U-shaped groove structure) from the total station and three-dimensional coordinate data (design data) of a design with each other; calculating a U-shaped groove structure construction difference (difference in each of a horizontal position and a height position); obtaining, from the difference, a moving direction and a moving distance to be corrected; and causing the display device to display the moving direction and the moving distance. In contrast, the structure may be arranged along a target line, such as a curve or a straight line. The conventional technology fails to disclose any guidance for the moving direction of the structure to approach the target line. In this respect, there has been a demand for such guidance for a moving direction of an object to be conveyed along a target line with high accuracy.

CITATION LIST

Patent Literature

Patent Literature 1: Japanese Unexamined Patent Publication No. 2017-25633

SUMMARY OF INVENTION

An object of the present invention is to provide a technology of performing guidance for a moving direction of an object to be conveyed along a target line with high accuracy.

A guidance system according to one aspect of the present invention includes: a detector which detects at least one of a coordinate of an object to be conveyed and a direction of the object; a controller which acquires the at least one of the coordinate of the object and the direction of the object detected by the detector, a display part; and a memory. The memory stores, in advance, target line information indicating an arrangement target of the object and related to a target line denoted by at least one of a curve and a polyline. The controller is configured to: calculate, based on the target line information, target information which is at least one of information about a target coordinate of the object and information about a target direction of the object; calculate, based on the at least one of the coordinate of the object and the direction of the object detected by the detector, detection information which is comparable with the target information; calculate a deviation of the detection information from the target information; and cause the display part to display a moving direction of the object which allows the deviation to decrease.

The present invention achieves the guidance for the moving direction of the object along the target line with high accuracy.

DESCRIPTION OF EMBODIMENTS

A guidance system 30 for use in conveying an object 20 to be conveyed by a working machine 1 shown in FIG. 1 will be described with reference to FIG. 1 to FIG. 11. It should be noted that the following embodiment illustrates one specific example of the present invention, and does not delimit the protection scope of the present invention.

Figure 1:
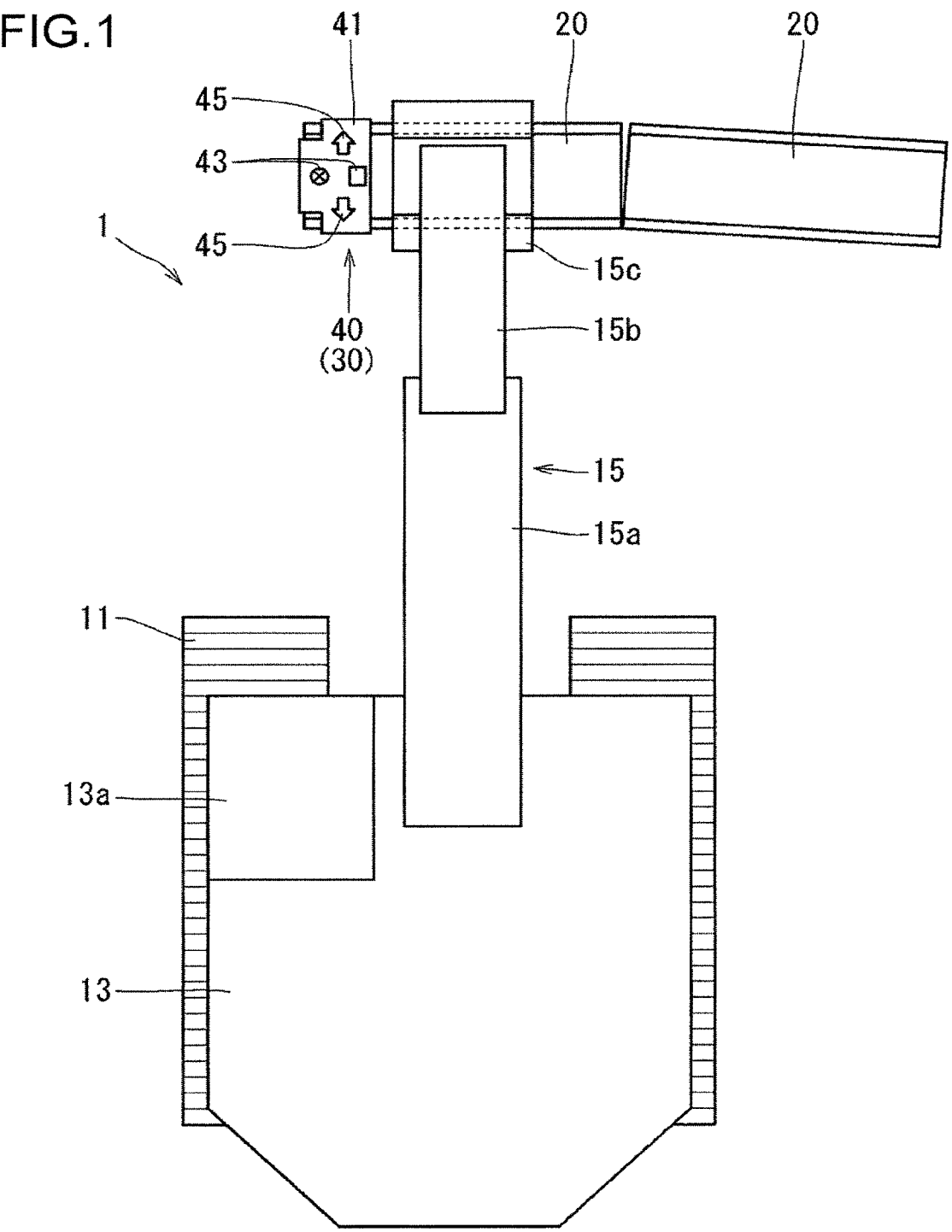
FIG. 1 is a top view of a working machine, an object to be conveyed, and a guidance system in a present embodiment as seen from above.

FIG. 1 is a top view of the working machine 1, the object 20 to be conveyed, and the guidance system 30 in the present embodiment as seen from above.

The working machine 1 performs a work of moving or conveying the object 20. The working machine 1 may be, for example, a construction machine, such as an excavator or a crane, performing a construction work. Hereinafter, the working machine 1 is described as the excavator. The working machine 1 includes a lower traveling body 11, an upper slewing body 13, and an attachment 15.

The lower traveling body 11 causes the working machine 1 to travel. The lower traveling body 11 includes, for example, a crawler. The upper slewing body 13 is slewably mounted on the lower traveling body 11. The upper slewing body 13 includes an operator compartment 13a. In the operator compartment 13a, an operator (machine operator) of the working machine 1 operates the working machine 1.

The attachment 15 is attached to the upper slewing body 13 rotatably in an up-down direction for moving the object 20. The attachment 15 includes, for example, a boom 15a, an arm 15b, and a gripping device 15c. The boom 15a is tiltably attached to the upper slewing body 13. The arm 15b is rotatably attached to the boom 15a. The gripping device 15c grips the object 20, i.e., grips the object in a sandwiching manner. The gripping device 15c is attached to the arm 15b rotatably in a specific direction, i.e., rotatably about three axes perpendicularly intersecting one another. The working machine 1 may, for example, hang the object 20 via a rope without causing the gripping device 15c to grip the object 20. In the case of hanging the object 20, the working machine 1 can hang the object 20 with, for example, a hook provided at a distal end of the arm 15b.

Figure 2:
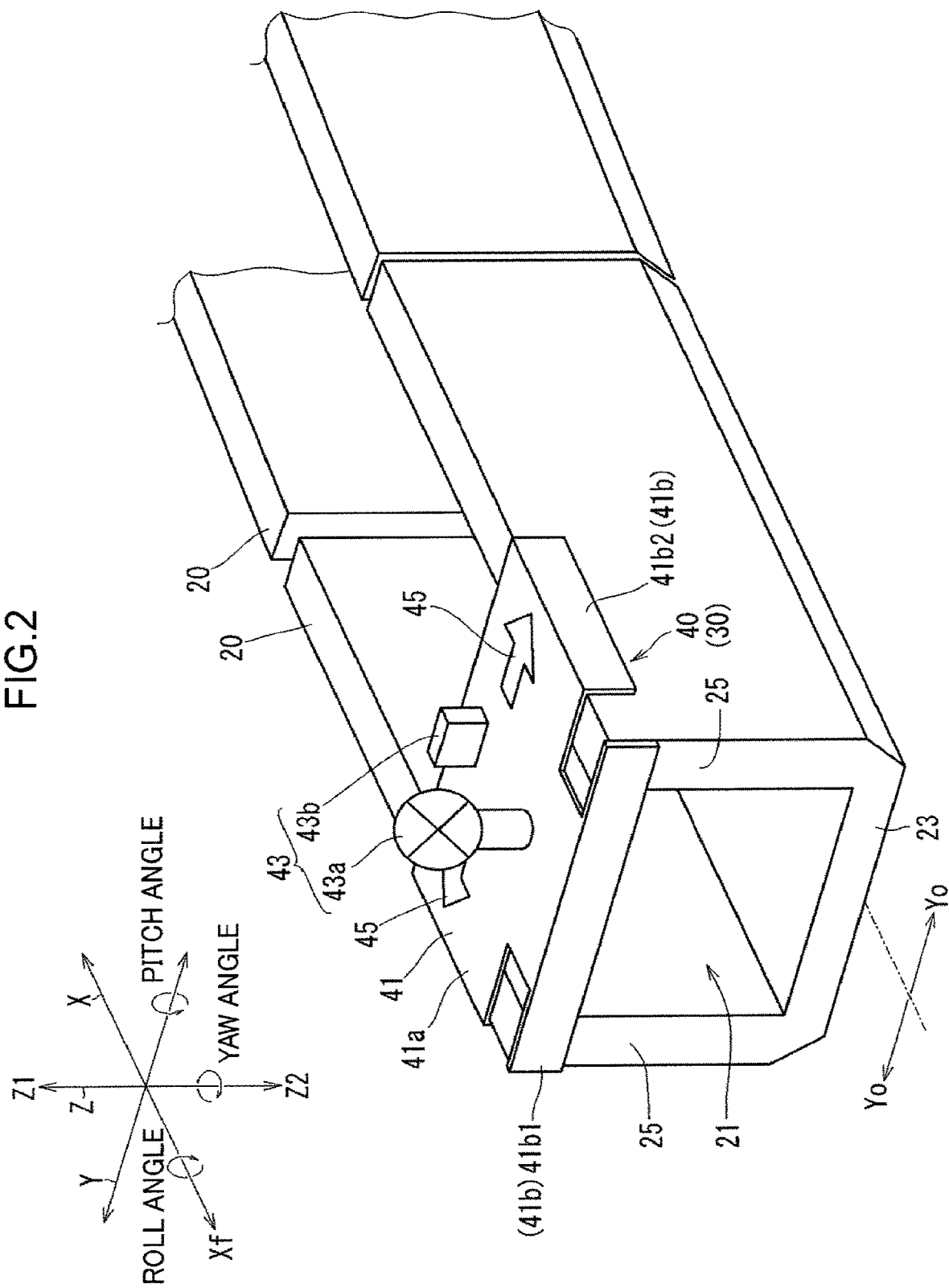
FIG. 2 is an external perspective view of the object to be conveyed and a frame part in the embodiment.

FIG. 2 is an external perspective view of the object 20 and a frame part 41 in the embodiment.

The object 20 represents a structure to be conveyed by the working machine 1 and targeted for guidance performed by the guidance system 30. The object 20 includes, for example, a precast member, such as a precast concrete material. As shown in FIG. 2, the object 20 includes, for example, a road ancillary structure, such as a U-shaped groove structure. A plurality of objects 20 are arranged, i.e., disposed or installed, continuously, i.e., side by side, in a line, or in a linking manner. Hereinafter, the object 20 will be mainly described as the U-shaped groove structure. The object 20 includes a groove part 21, a bottom part 23, and a side part 25.

Directions concerning the object 20 includes a front-rear direction X, a widthwise direction Y, and an up-down direction Z. Directions concerning the guidance system 30 attached to the object 20 are defined in the same manner. When the object 20 is presumed to be horizontally arranged, a direction agreeing with a vertical direction is defined as the up-down direction Z, and further a vertically upper side therein is defined as an upper side Z1 and a vertically lower side therein is defined as a lower side Z2. The object 20 is not necessarily horizontally arranged. A specific direction of the object 20 perpendicularly intersecting the up-down direction Z is defined as the front-rear direction X. The front-rear direction X may correspond to, for example, a longitudinal direction of the object 20, or an extending direction of the groove part 21. One side in the front-rear direction X is defined as a front side Xf. A direction perpendicularly intersecting the front-rear direction X and the up-down direction Z is defined as the widthwise direction Y. In the widthwise direction Y, a specific side away from a center of the object 20 in the widthwise direction Y is defined as a widthwise outer side Yo.

Rotation angles about the object 20 include a roll angle, a pitch angle, and a yaw angle. Rotation angles about the guidance system 30 attached to the object 20 are defined in the same manner. A rotational axis extending in the front-rear direction X is defined as a roll axis, a rotational axis extending in the widthwise direction Y is defined as a pitch axis, and a rotational axis extending in the up-down direction Z is defined as a yaw axis. The roll angle represents a rotation angle of the object 20 about the roll axis. The pitch angle represents a rotation angle of the object 20 about the pitch axis. The yaw angle represents a rotation angle of the object 20 about the yaw axis. The yaw angle represents a rotation angle of the object 20 in a plan view, that is, a rotation angle of the object 20 seen in the up-down direction Z.

The groove part 21 has a grove defined by an inner surface having a U-shape when seen in the front-rear direction X. The groove part 21 extends in the front-rear direction X. The bottom part 23 corresponds to a lower side Z2-portion of the object 20 and forms a bottom surface of the groove part 21. The side part 25 corresponds to a widthwise outer side Yo-portion of the object 20 on the opposite sides thereof and forms a side surface of the groove part 21.

Figure 3:
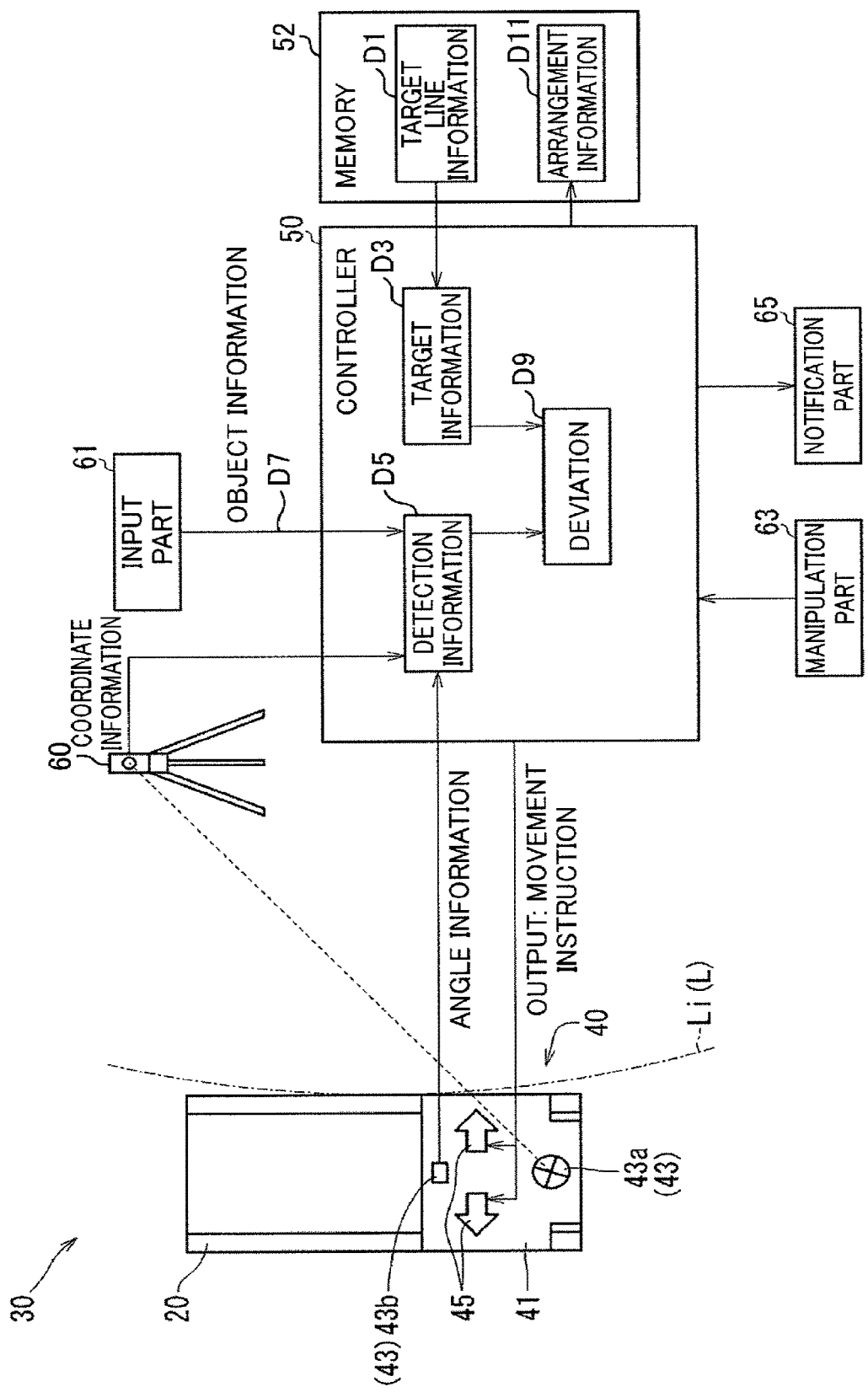
FIG. 3 is a block diagram showing a configuration of the guidance system according to the embodiment.

FIG. 3 is a block diagram showing a configuration of the guidance system 30 according to the embodiment.

The guidance system 30 performs guidance (induction) to move, based on a target line denoted by at least one of a curve and a polyline, the object 20 to a target position. As shown in FIG. 3, the guidance system 30 includes a guidance device 40, a controller 50, a memory 52, an input part 61, a manipulation part 63, and a notification part 65.

The guidance device 40 is attached to the object 20 as shown in FIG. 2. The guidance device 40 is detachably attached to the object 20, and mounted on, for example, an upper side Z1-portion of the object 20. For instance, the guidance device 40 is independent of the attachment 15 shown in FIG. 1. Alternatively, the guidance device 40 may be integrated with the attachment 15, for example, may be integrated with the gripping device 15c. The guidance device 40 includes the frame part 41, a detector 43, and a display part 45.

The frame part 41 is attached to the object 20. As shown in FIG. 2, the frame part 41 has, for example, a substantially plate shape. The frame part 41 includes a frame main body 41a having a substantially plate shape, and a positioning section 41b.

The positioning section 41b is a member for positioning the guidance device 40 to the object 20. The positioning section 41b is configured to allow a position of the detector 43 and a position of the object 20 relative to each other to fall within a given range, that is, the relative positions are always substantially fixed, when the guidance device 40 is attached to the object 20. The positioning section 41b is fixedly attached to the frame main body 41a. The positioning section 41b extends downward from an end of the frame main body 41a to the lower side Z2. The positioning section 41b includes, for example, a front surface positioning portion 41b1 and a side surface positioning portion 41b2.

The front surface positioning portion 41b1 is disposed parallelly to a front side Xf-portion (e.g., front surface) of the object 20 and can come into contact with the front side Xf-portion of the object 20 when the frame part 41 is attached to the object 20. The front surface positioning portion 41b1 extends downward from an end of the frame main body 41a on the front side Xf to the lower side Z2. When the frame part 41 is attached to the object 20, the side surface positioning portion 41b2 is disposed parallelly to the widthwise outer side Yo-portion of the object 20, i.e., disposed parallelly to a side surface of the object 20, and can come into contact with the widthwise outer side Yo-portion of the object 20, i.e., come into contact with the side surface of the object 20. The side surface positioning portion 41$b$2 extends downward from an end of the frame main body 41$a$ on the widthwise outer side Yo to the lower side Z2. The side surface positioning portion 41$b$2 may be provided at each of the opposite (left and right) positions of the frame main body 41$a$ on the corresponding widthwise outer side Yo, or provided at one of the positions.

The detector 43 detects at least one of a coordinate of the object 20 and a direction of the object 20. The detector 43 in the embodiment detects the coordinate of the object 20 and the direction of the object 20. The coordinate of the object 20 detected by the detector 43 represents a coordinate (position coordinate) showing a three-dimensional position of the object 20. The direction of the object 20 detected by the detector 43 defines a posture or a tilt angle of the object 20, and further defines, for example, the roll angle, the pitch angle, and the yaw angle of the object 20. The detector 43 is attached to the frame part 41. The detector 43 is attached to the object 20 via a frame part 41. The detector 43 includes, for example, a prism member 43$a$ and an angle sensor 43$b$.

The prism member 43$a$ detects the coordinate of the object 20. More specifically, a gauge 60 shown in FIG. 3 detects a coordinate of the prism member 43$a$, and outputs coordinate information about the prism member 43$a$ to the controller 50. The gauge 60 includes, for example, a total station. The gauge 60 and the controller 50 are communicably connected to each other by a wireless or wired communication. The controller 50 calculates, based on the coordinate information about the prism member 43$a$, the coordinate of the object 20.

The angle sensor 43$b$ detects the direction of the object 20, and detects, for example, at least one of the roll angle, the pitch angle, and the yaw angle of the object 20. When the angle sensor 43$b$ detects the yaw angle of the object 20, the angle sensor 43$b$ may detect the yaw angle by using geomagnetism, or calculate, based on a rotational acceleration on a horizontal plane, the yaw angle. The angle sensor 43$b$ outputs the detected angle information to the controller 50. The angle sensor 43$b$ and the controller 50 are communicably connected to each other by a wireless or wired communication.

The detector 43 may be configured in any manner as long as the detector can detect the coordinate of the object 20 and the direction of the object 20. For instance, the number of prism members 43$a$, and the number of axes for rotation angles detectable by the angle sensor 43$b$ are variously settable. The angle sensor 43$b$ may be excludable depending on the number of prism members 43$a$ and the position of each prism member 43$a$ to the object 20. Besides, the detector 43 may detect the at least one of the coordinate of the object 20 and the direction of the object 20 by using a satellite positioning system.

Furthermore, the detector 43 may include a camera or a Light Detection And Ranging (LIDAR). The controller 50 may detect the at least one of the coordinate of the object 20 and the direction of the object 20 by analyzing an image acquired by the camera or the LIDAR.

The display part 45 displays a direction in which the object 20 is caused to move. In other words, the display part 45 shows a moving instruction of causing the object 20 to move in a specific direction. Specifically, the display part 45 performs guidance displaying in the specific direction in which the object 20 is caused to move. The direction in which the object 20 is caused to move will be described in detail later. The display part 45 performs the displaying based on the output from the controller 50. The display part 45 and the controller 50 are communicably connected to each other by a wireless or wired communication. The display part 45 may be in the form of an emitter having a predetermined shape or a screen displaying a predetermined shape. For instance, the predetermined shape may show the direction in which the object 20 is caused to move, e.g., may be in the form of an arrow or a triangle.

For example, the display part 45 is provided on the frame part 41. This allows a worker to visually confirm the displaying on the display part 45 while visually confirming the object 20. The worker may be an operator of the working machine 1, or another worker (manual setter) who performs a task about the object 20 near the object 20. The display part 45 may be independent of the frame part 41. The display part 45 may be integrated with the controller 50 or may be independent of the controller 50. The display part 45 may be in the form of a display screen of a portable device including the controller 50. The display part 45 may be located inside the operator compartment 13$a$ or outside the operator compartment 13$a$.

For instance, the memory 52 includes a flush memory or a magnetic disc device for storing various kinds of programs and information, and serves as a work memory of the controller 50.

The memory 52 stores, in advance, target line information D1 indicating an arrangement target of the object 20 and related to a target line denoted by at least one of a curve or a polyline.

The controller 50 executes an input and an output of a signal, an information process, and a calculation. For instance, the controller 50 receives an input of a detection result of the detector 43. For instance, the controller 50 receives an input of information (target line information D1) related to the target line. In other words, the controller 50 acquires at least one of the coordinate of the object 20 and the direction of the object 20 detected by the detector 43. Moreover, the controller 50 acquires the target line information D1 from the memory 52.

The controller 50 may be located inside the working machine 1 or outside the working machine 1. The controller 50 may be included in a portable device carried by the worker. The portable device includes, for example, a tablet-type computer or a smartphone. The worker carrying the portable device may be the operator of the working machine 1 or the manual setter.

The input part 61 inputs object information D7 to the controller 50. The object information D7 is information about the object 20 to be conveyed and includes a dimension of the object 20. The object information D7 will be described in detail later. The input part 61 may automatically acquire or calculate the object information D7. For instance, the input part 61 may be a reader which reads out the object information D7 from an electronic tag provided to the object 20. For instance, the electronic tag may be imbedded in the object 20 or may be attached to the object 20. The input part 61 may be an image analyzer which calculates the object information D7 by analyzing an image of the object 20. The input part 61 may be, for example, an input device for receiving an input of the object information D7 by the worker. The input device includes, for example, a keyboard or a touch screen.

The manipulation part 63 is manipulated by the worker to manipulate the controller 50. The manipulation part 63 receives an instruction of a guidance start, a selection of a guidance mode, and a selection of a point of the object 20 targeted for the guidance, each of which will be described later. The manipulation part 63 may be integrated with the controller 50 or may be independent of the controller 50. The manipulation part 63 may be in the form of a touch screen of the portable device including the controller 50. The manipulation part 63 may be located inside the operator compartment 13a or outside the operator compartment 13a. The manipulation part 63 may be, for example, a switch provided to a manipulation lever for manipulating the working machine 1.

The notification part 65 outputs a notification or a warning by the controller 50. The notification part 65 may execute the notification through displaying or with a voice. The notification part 65 may be provided to the frame part 41 or may be independent of the frame part 41. The notification part 65 may be allotted per notification or warning depending on a content thereof, or may be shared with a plurality of kinds of notifications or warnings. The notification part 65 may be integrated with the controller 50 or may be independent of the controller 50. The notification part 65 may be located inside the operator compartment 13a or outside the operator compartment 13a.

The guidance system 30 shown in FIG. 3 is configured to operate in a manner to be described below. Hereinafter, the gist of the operation of the guidance system 30 (mainly, the controller 50) will be described. The controller 50 calculates, based on the target line information D1, target information D3 which is at least one of information about a target coordinate of the object 20 and information about a target direction of the object 20.

The controller 50 calculates, based on the at least one of the coordinate of the object 20 and the direction of the object 20 detected by the detector 43, detection information D5 about the object 20 which is comparable with the target information D3. The controller 50 calculates the detection information D5 about the object 20, based on the at least one of the coordinate of the object 20 and the direction of the object 20 detected by the detector 43, and further based on the object information D7 if necessary. Specifically, the controller 50 may calculate the detection information D5, based on the at least one of the coordinate of the object 20 and the direction of the object 20 detected by the detector 43, and based on the object information D7 input by the input part 61.

For instance, the controller 50 acquires, from the gauge 60, coordinate information (detection information D5) in a three-dimensional space of the prism member 43a attached to the frame part 41. The controller 50 further acquires, from the angle sensor 43b attached to the frame part 41, the angle information (detection information D5) about the roll angle, the pitch angle, and the yaw angle of the object 20. The position of the object 20 at which the frame part 41 is attached is predetermined. Hence, the controller 50 can calculate a position coordinate of the object 20 in the three-dimensional space, based on the detection information D5 including the coordinate information and the angle information, and based on the object information D7 indicating the dimension of the object 20.

The controller 50 calculates a deviation D9 of the detection information D5 from the target information D3. The controller 50 causes the display part 45 to display a moving direction of the object 20 which allows the deviation D9 to decrease. The guidance system 30 includes performing guidance for the moving direction of the object 20 based on the coordinate of the object 20, and performing guidance for the moving direction of the object 20 based on the direction (yaw angle) of the object 20. The operation of the guidance system 30 will be described in detail below.

The controller 50 acquires target line information D1. The memory 52 stores, in advance, the target line information D1 before the guidance system 30 performs the guidance. The target line information D1 is related to a target line L indicating an arrangement target of the object 20. More specifically, the target line information D1 indicates a three-dimensional position of the target line L in a coordinate system (site coordinate system) showing a position on a work site. The target line L includes at least one of a curve and a polyline. The target line L may be denoted by only a straight line.

The controller 50 calculates, based on the target line information D1, target information D3. The target information D3 is information about a target of the object 20. For instance, the target information D3 may be information (target coordinate information) about a target coordinate of the object 20 (Example A1). In this case, the target information D3 may be information about a coordinate of a certain point on the target line L (coordinate of each point on the target line L). Furthermore, for instance, the target information D3 may be information (target direction information) about the target direction of the object 20, or may be information (target yaw angle information) about a target yaw angle of the object 20 (Example A2). In this case, the target information D3 may be information in a tangent direction of the target line L denoted by a curve, or may be information in a direction in which the target line denoted by a polyline extends. The target information D3 will be described in detail later.

The controller 50 calculates, based on a detection value of the detector 43, detection information D5. The controller 50 may calculate, based on the detection value of the detector 43 and object information D7, the detection information D5. The detection information D5 is comparable with the target information D3. For example, in a case where the target information D3 is information (target coordinate information) about the target coordinate of the object 20, the detection information D5 is information (detection coordinate information) about the coordinate of the object 20 detected by the detector 43 (Example B1.) In this case, the detection information D5 is information about a coordinate of a specific point (e.g., a middle point 20e shown in FIG. 6) of the object 20, the point being required for the guidance. A coordinate of a point of the object 20 that is unrequired for the guidance may not be calculated, and may not be included in the detection information D5. Furthermore, for instance, when the target information D3 is information (target yaw angle information) about a target yaw angle of the object 20, the detection information D5 is information (detection yaw angle information) about the yaw angle of the object 20 detected by the detector 43 (Example B2).

The controller 50 may need the object information D7 in addition to the detection value of the detector 43 when calculating the detection information D5. The object information D7 includes a dimension of the object 20. Specifically, the object information D7 includes an external dimension of the object 20, more specifically, includes the dimension of the object 20 in each of the front-rear direction X, the widthwise direction Y, and the up-down direction Z shown in FIG. 2. The object information D7 includes a three-dimensional shape of the object 20. The object information D7 may include the positions of the detector 43 and the object 20 relative to each other. The object information D7 is input from the input part 61 to the controller 50. A part of the object information D7 may be stored in the memory 52 in advance. For example, when the object 20 is a U-shaped groove structure, a shape of the U-shaped groove structure seen in the front-rear direction X shown in FIG. 2 may be stored in the memory 52 in advance, and the length thereof in the front-rear direction X may be input from the input part 61 to the controller 50.

The controller 50 calculates a deviation D9 of the detection information D5 from the target information D3. For instance, when each of the target information D3 and the detection information D5 is information about a coordinate, the controller 50 calculates a deviation D9 (distance between two points) of detection coordinate information (see Example B1 above) from the target coordinate information (see Example A1 above) (Example C1). Furthermore, for example, when each of the target information D3 and the detection information D5 is information about the yaw angle, the controller 50 calculates a deviation D9 (yaw angle difference) of the detection yaw angle information (see Example B2 above) from the target yaw angle information (see Example A2 above) (Example C2).

The controller 50 causes the display part 45 to display a direction in which the object 20 is caused to move, specifically, a moving direction (direction for parallel movement or rotational movement) of the object 20 which allows the deviation D9 to decrease. The moving direction includes a direction in which the object 20 is caused to parallelly move or a direction in which the object 20 is caused to rotationally move. The operator of the working machine 1 causes the object 20 to move in accordance with the displaying on the display part 45. Accordingly, the object 20 approaches a target position, the target information D3 and the detection information D5 approximate to each other, and the deviation D9 falls below a predetermined value. Specifically, the deviation D9 falls below a tolerance value, or reaches substantially zero. In other words, the target information D3 and the detection information D5 agree with each other. The controller 50 may cause the notification part 65 to output a notification indicating a state where the target information D3 and the detection information D5 agree with each other when the two pieces of information reach the agreeing state. The notification part 65 may output a notification indicating an agreement between a detection position of the object 20 and an arrangement target position. For example, the notification part 65 may display the agreement between the detection position of the object 20 and the arrangement target position.

The controller 50 causes the notification part 65 to output a warning when a coordinate of a certain point of the object 20 shifts over (deviates from) the target line L from one position to another position (opposite to the one position) in the plan view. For instance, the warning may be output by the notification part 65, and may be output through displaying or with a voice. In a case where the object 20 is a road ancillary structure, the warning can provide the following advantageous effects. Normally, a road has a width set to a predetermined value. In this case, when the object 20 is arranged at a position to be on the road, the width of the road fails to reach the predetermined value. To avoid this situation, the target line L is, for example, set as a boundary between the road and the object 20. When the object 20 shifts over the target line L to the road, the notification part 65 outputs the warning. In this manner, the warning can be notified to the worker when the worker shifts the object 20 over the target line L to the road.

The controller 50 causes the memory 52 to store arrangement information D11 about the object 20 when the target information D3 and the detection information D5 agree with each other. The arrangement information D11 includes, for example, the coordinate of the object 20 detected by the detector 43, the direction of the object 20 detected by the detector 43, and the object information D7 including the dimension of the object 20. The arrangement information D11 may include other information, such as date and time when the object 20 is arranged. The arrangement information D11 may include information about a reference yaw angle to be described later.

Hereinafter, specific examples of the embodiment will be described.

Example 1

In Example 1 of the embodiment, a plurality of objects 20 is arranged outside a target line denoted by a curve therealong, and detection information is calculated, based on a coordinate of each of the objects 20.

Figure 4:
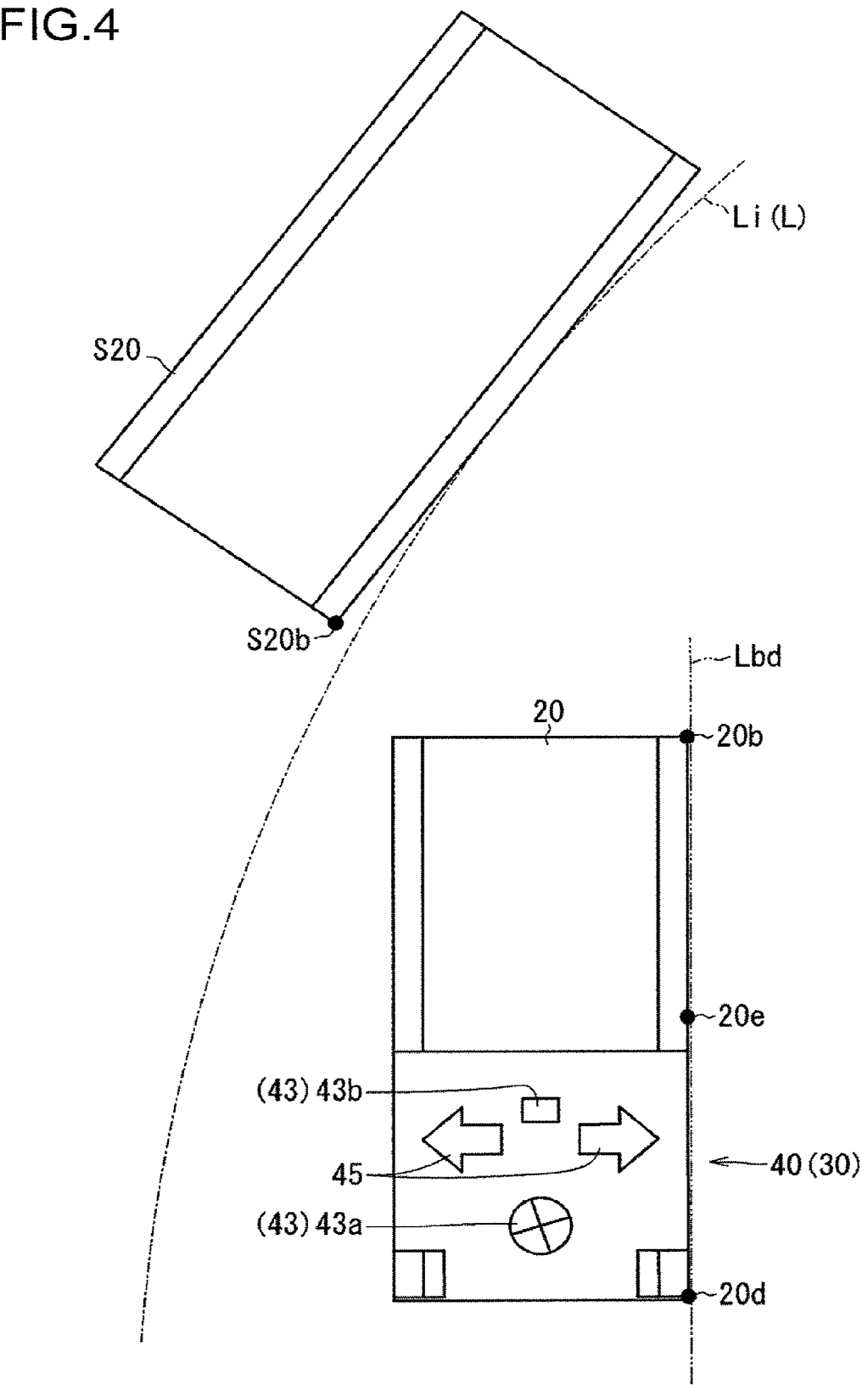
FIG. 4 is a top view of a work site before the object is arranged outside a target line in Example 1 of the embodiment as seen from above.
Figure 5:
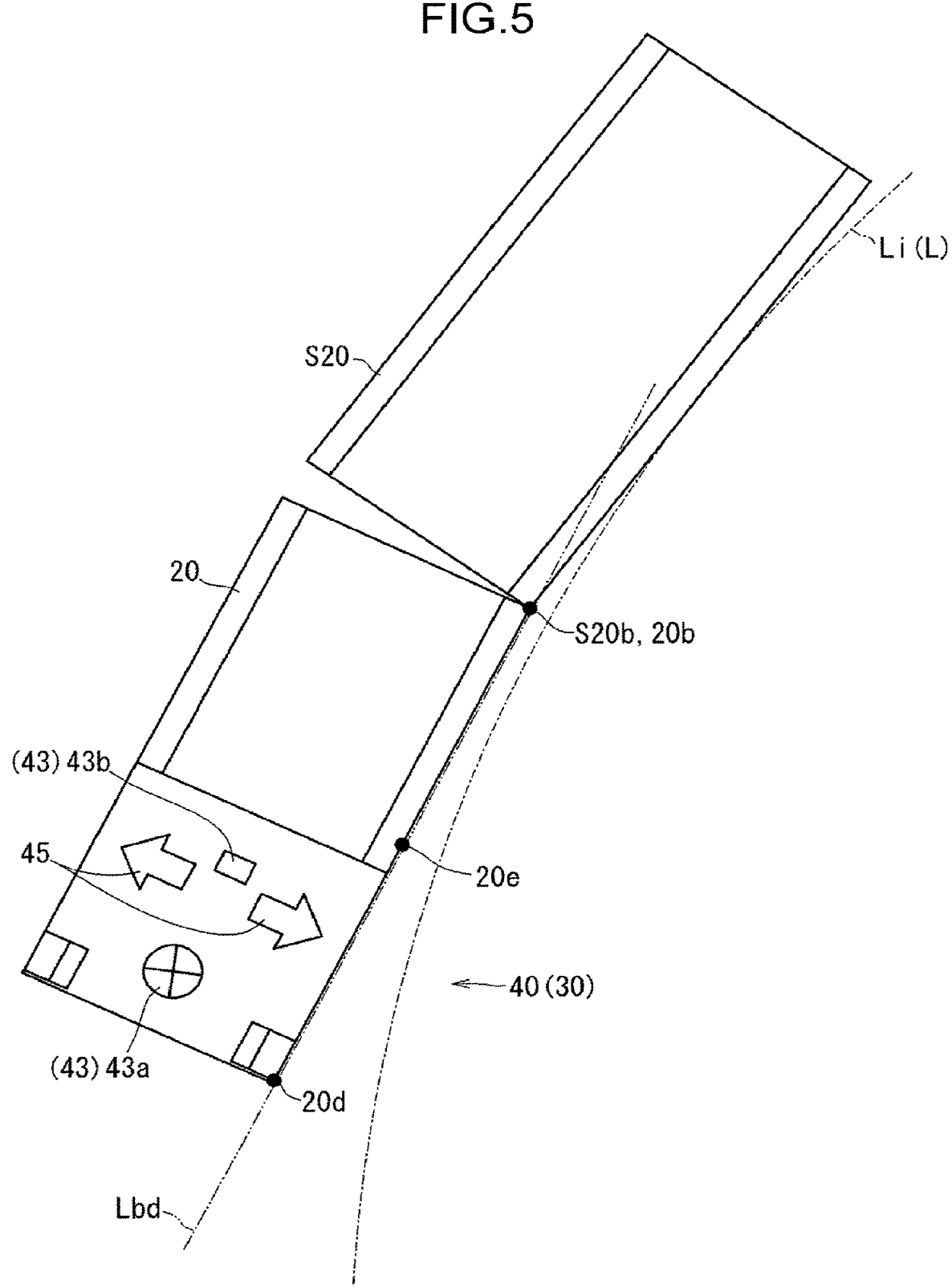
FIG. 5 is a top view of the work site in a state where a point denoting an end of the object that is closer to a reference structure and closer to the target line as shown in FIG. 4 meets a point denoting an end of the reference structure that is closer to the object and closer to the target line, as seen from above.
Figure 6:
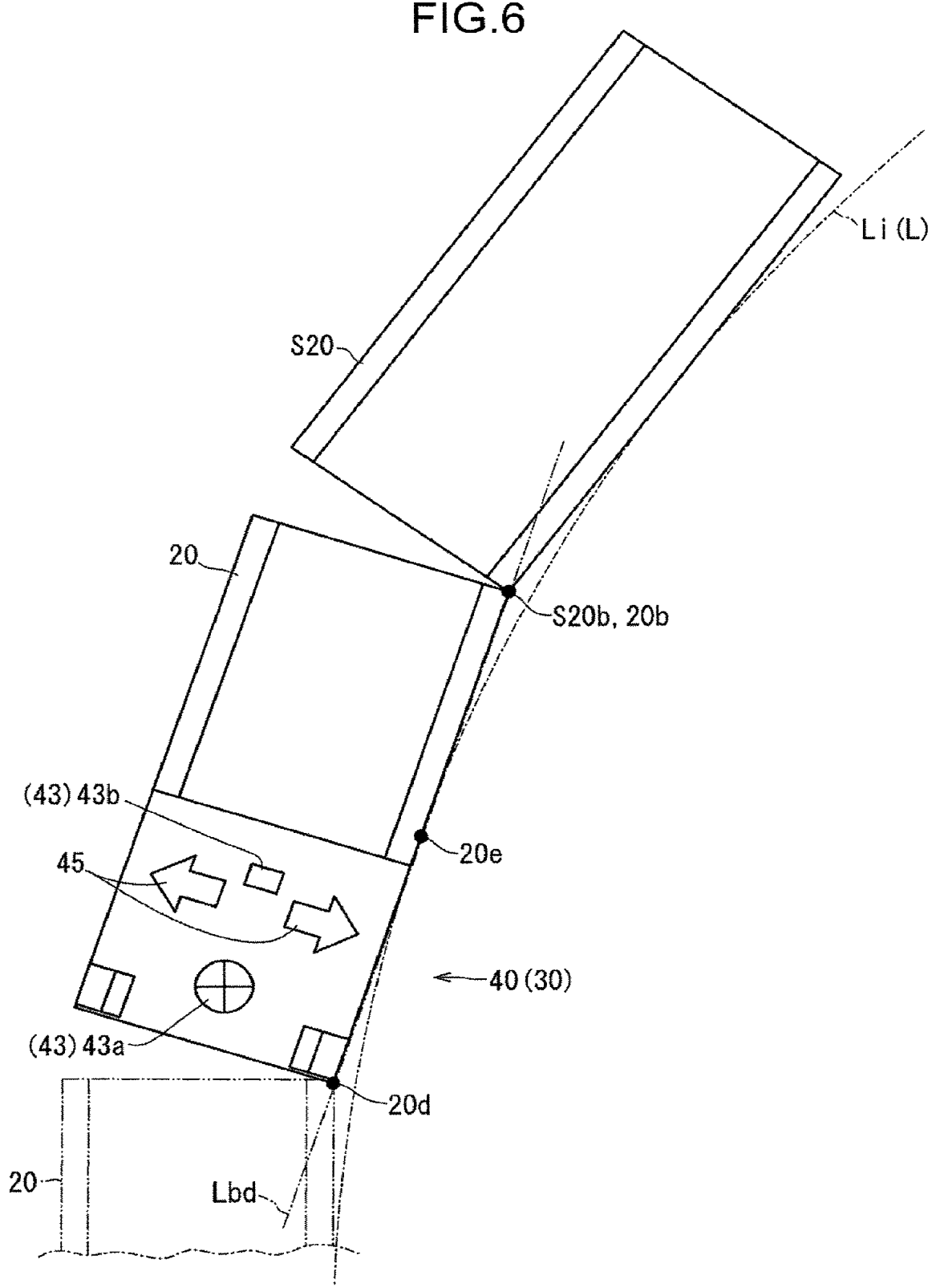
FIG. 6 is a top view of the work site in a state where the object shown in FIG. 5 is arranged along the target line as seen from above.

FIG. 4 is a top view of a work site before the object 20 is arranged outside a target line Li in Example 1 of the embodiment as seen from above. FIG. 5 is a top view of the work site in a state where a point 20b denoting an end of the object 20 that is closer to a reference structure S20 and closer to the target line Li as shown in FIG. 4 meets a point S20b denoting an end of the reference structure S20 that is closer to the object 20 and closer to the target line Li, as seen from above. FIG. 6 is a top view of the work site in a state where the object 20 shown in FIG. 5 is arranged along the target line Li as seen from above.

In Example 1 shown in FIG. 6, the objects 20 and the reference structure S20 are arranged continuously to form a curve (or a substantially curve). Each of the objects 20 is arranged so that an inner section of the objects 20 forming the curve, i.e., a section closer to a center of an arc which is defined to be a part of the curve, extends along the target line Li. In Example 1, this arrangement is called a target line-inner section arrangement. In other words, the objects 20 are arranged outside the target line Li denoted by the curve therealong. Hereinafter, a procedure sequence for the target line-inner section arrangement in Example 1 will be described.

As shown in FIG. 4, the reference structure S20 serving as a reference for the arrangement of the object 20 is arranged in advance on the work site. Here, an object 20 arranged to let target information D3 and detection information D5 agree with each other, in detection of at least one of a coordinate of the object 20 and a direction of the object 20 by the detector 43, is defined as the reference structure S20. The reference structure S20 has such a configuration that the detector 43 is attachable thereto, more specifically, the detector 43 is attachable thereto via the frame part 41. The reference structure S20 is arranged so that, when the detector 43 is attached thereto and the detector 43 detects at least one of a coordinate of the reference structure S20 and a direction of the reference structure S20, target information D3 which is at least one of information about the target coordinate of the reference structure S20 and information about the target direction of the reference structure S20 agrees with detection information D5 which is comparable with the target information D3.

The reference structure S20 may be guided by the guidance system 30 to reach a target position and be arranged there. The reference structure S20 may be the object 20. For instance, the reference structure S20 may be arranged at the target position without using the guidance system 30. For instance, the reference structure S20 may be arranged at a predetermined reference position on the work site.

The guidance device 40 is attached to the object 20. For instance, when the guidance device 40 is independent of the attachment 15, the guidance device 40 is manually attached to the object 20 by a worker. When the guidance device 40 is integrated with the attachment 15, an operator of the working machine 1 connects the guidance system 30 to the object 20 by manipulating the attachment 15. Calibration for the detector 43 is performed after the guidance device 40 is attached to the object 20 if necessary. The calibration for the detector 43 will be described later. The worker (operator of the working machine 1, or manual setter) selects a guidance mode by manipulating the manipulation part 63. Specifically, the worker selects a target line-inner section arrangement mode.

FIG. 6 shows a state where the reference structure S20 and the object 20 are adjacent to each other, i.e., a target state where the object 20 is at the target position. In the target state, an end at a corner of the object 20, among four corners thereof, which is away from the reference structure S20 and closer to the target line Li in a plan view is defined as a point 20$d$. In the target state, an end at another corner of the object 20, among the four corners thereof, which is closer to the reference structure S20 and closer to the target line Li in the plan view is defined as a point 20$b$. In the target state, an end at a corner of the reference structure S20, among four corners thereof, which is closer to the object 20 and closer to the target line Li in the plan view is defined as a point S20$b$.

The controller 50 calculates, based on the detection information D5 and the object information D7, a coordinate of each of the point 20$b$ and the point 20$d$ of the object 20 shown in FIG. 4. The controller 50 obtains a formula for a straight line Lbd passing through the point 20$b$ and the point 20$d$. Although the straight line Lbd slightly deviates from the side surface (surface on the widthwise outer side Yo in FIG. 2) of the object 20 in FIG. 4, the straight line Lbd actually agrees with the side surface of the object 20.

First, positioning of the point 20$b$ of the object 20 will be described.

In FIG. 4 and FIG. 5, the operator of the working machine 1 moves the object 20 so that the point 20$b$ of the object 20 approaches the target position. Specifically, the target position is the point S20$b$ of the reference structure S20. In this case, the operator may visually move the object 20 so that the point 20$b$ of the object 20 approaches the point S20$b$ of the reference structure S20. At this time, the operator may visually move the object 20 in accordance with guidance by the guidance system 30 so that the point 20$b$ of the object 20 approaches the point S20$b$ of the reference structure S20. When adopting the guidance, the operator selects the point 20$b$ of the object 20 as a point targeted for the guidance by manipulating the manipulation part 63. In response, the guidance system 30 performs the guidance so that the point 20$b$ of the object 20 approaches the point S20$b$ of the reference structure S20.

The position (coordinate) of the point S20$b$ of the reference structure S20 may be stored in the memory 52 in advance. The controller 50 may calculate, based on the detection information D5 about the reference structure S20 and the object information D7 about the reference structure S20, the position of the point S20$b$ of the reference structure S20. The controller 50 may cause the memory 52 to store the calculated position of the point S20$b$ of the reference structure S20. In this case, the guidance device 40 is attached to the reference structure S20 to calculate the position of the point S20$b$ of the reference structure S20.

In this respect, the operator may perform the positioning of the reference structure S20 and the object 20 to meet each other in the up-down direction in a visual manner or in accordance with guidance by the guidance system 30.

Subsequently, positioning of the object 20 along the target line Li will be described.

The operator instructs the controller 50 to start guidance operability by manipulating the manipulation part 63. For instance, the operator pushes down the guidance start button of the manipulation part 63. In response to this, the controller 50 performs various kinds of calculations.

The controller 50 calculates information about the target coordinate of the object 20 as the target information D3. Specifically, the controller 50 calculates coordinates of a plurality of points on the target line Li as target information D3 (target coordinate information).

Moreover, the controller 50 calculates information about a coordinate of a specific point of the object 20 as the detection information D5, based on the coordinate of the object 20 detected by the detector 43, the direction of the object 20 detected by the detector 43, and the object information D7 input by the input part 61. The controller 50 calculates a coordinate of a point on the straight line Lbd shown in FIG. 5 as detection information D5 (detection coordinate information). The detection information D5 may include, for example, coordinates of a plurality of points at equal intervals on the straight line Lbd. The detection information D5 may include, for example, a coordinate of the middle point 20$e$ that is on the straight line Lbd between the point 20$b$ and the point 20$d$ when the target line Li is denoted by an arc. The controller 50 calculates, as a deviation D9, a shortest distance between the target line Li and the straight line Lbd. The controller 50 causes the display part 45 to display a moving direction of the object 20 which allows the deviation D9 to decrease.

The operator of the working machine 1 moves the object 20 in accordance with the guidance (displaying on the display part 45). At this time, the controller 50 causes the notification part 65 to output a warning when at least a section of the object 20 shifts to an inner position than the target line Li, i.e., shifts closer to a center of an arc which is defined to be a part of the target line Li. The operator preferably moves the object 20 to approach the target line Li in a state where the point 20$b$ of the object 20 is in contact with the point S20$b$ of the reference structure S20.

When the operator moves the object 20 in accordance with the guidance, the deviation D9 falls below a predetermined value. In other words, the target information D3 and the detection information D5 agree with each other. In the example shown in FIG. 6, the straight line Lbd of the object 20 is in contact (or substantially contact) with the target line Li in the plan view. In FIG. 6, the middle point 20$e$ between the point 20$b$ and the point 20$d$ serves as a contact point between the straight line Lbd and the target line Li. However, the middle point 20$e$ does not necessarily serve as the contact point between the straight line Lbd and the target line Li. When the target information D3 and the detection information D5 agree with each other, the controller 50 causes at least one of the display part 45 and the notification part 65 to output a notification indicating the agreeing state.

Then, the operator releases the object 20. Specifically, the gripping device 15$c$ releases the gripping of the object 20, or the attachment 15 releases the hanging of the object 20. The worker instructs the controller 50 to finish the guidance operability by manipulating the manipulation part 63. For instance, the worker repushes down the guidance start button of the manipulation part 63. The controller 50 causes the memory 52 to store the arrangement information D11 when the target information D3 and the detection information D5 agree with each other.

The manual setter performs, for example, the following tasks after the object 20 reaches the target position as shown in FIG. 6. The manual setter adjusts a roll angle and a pitch angle (gradient) of the object 20. For instance, the manual setter adjusts the pitch angle of the object 20 for allowing water to flow through the groove part 21. The manual setter detaches the guidance device 40 from the object 20 after confirming the arrangement of the object 20 as targeted, and attaches the guidance device 40 to a subsequent object 20 to be conveyed and arranged. The manual setter further performs a task of filling a gap (joint) between the objects 20.

Example 2

In Example 2 of the embodiment, a plurality of objects 20 is arranged inside a target line denoted by a curve thereal-ong, and detection information is calculated, based on a coordinate of each of the objects 20.

Figure 7:
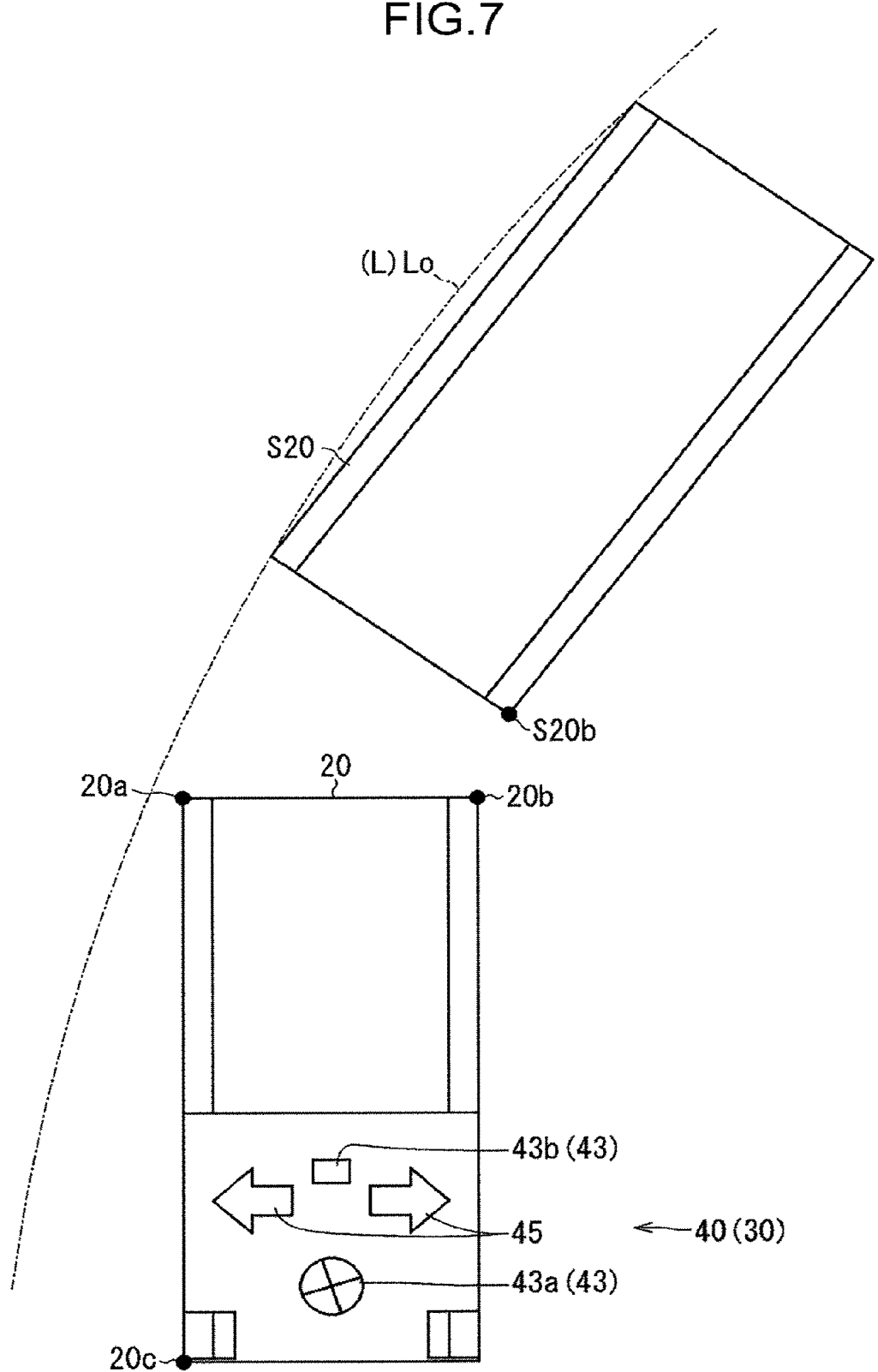
FIG. 7 is a top view of a work site before an object to be conveyed is arranged inside a target line in Example 2 of the embodiment as seen from above.
Figure 8:
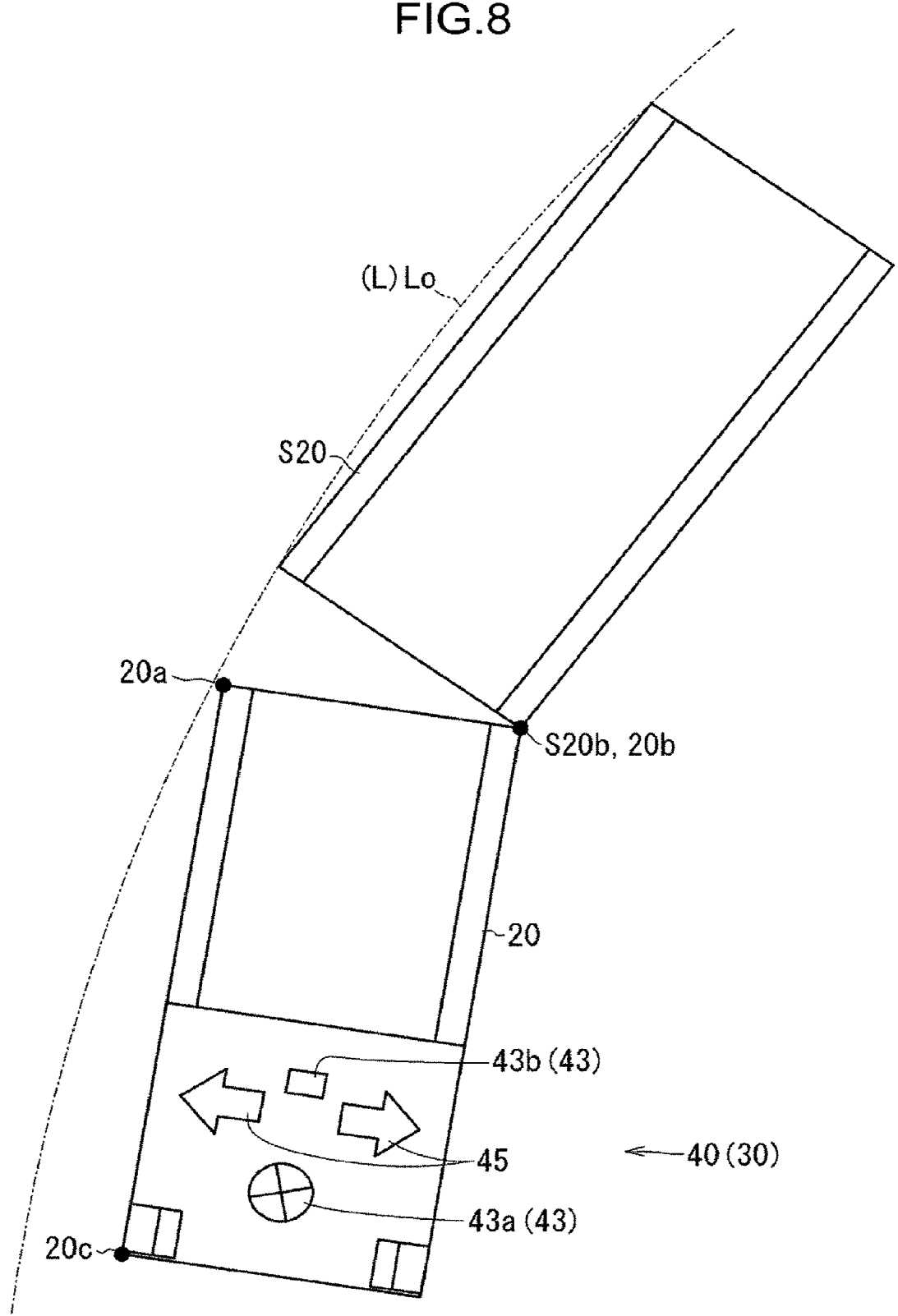
FIG. 8 is a top view of the work site in a state where a point denoting an end of the object that is closer to a reference structure and away from the target line as shown in FIG. 7 meets a point denoting an end of the reference structure that is closer to the object and away from the target line, as seen from above.
Figure 9:
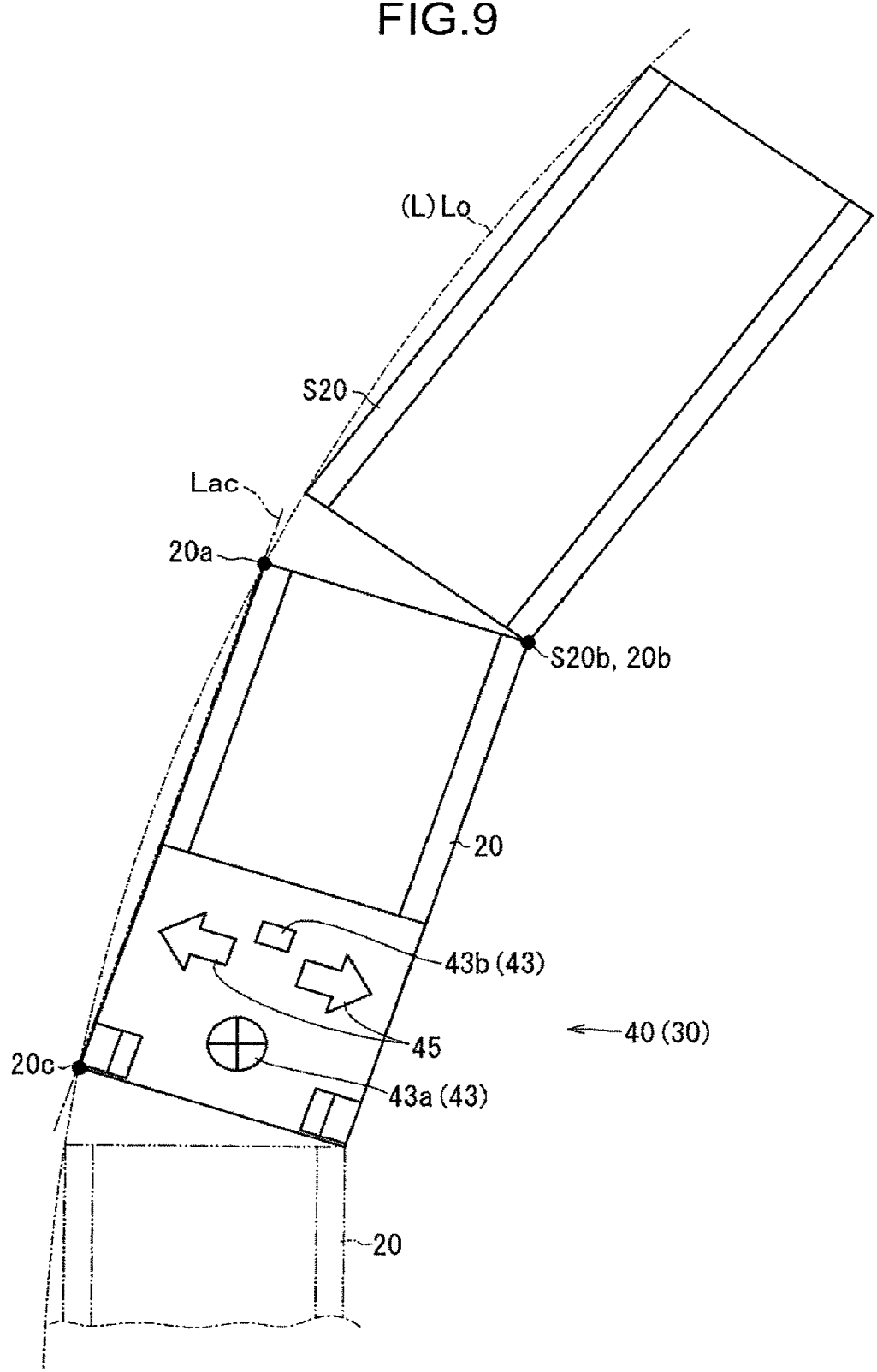
FIG. 9 is a top view of the work site in a state where the object shown in FIG. 8 is arranged along the target line as seen from above.

FIG. 7 is a top view of a work site before the object 20 is arranged inside a target line Li in Example 2 of the embodiment as seen from above. FIG. 8 is a top view of the work site in a state where a point 20*b* denoting an end of the object 20 that is closer to a reference structure S20 and away from the target line Lo shown in FIG. 7 meets a point S20*b* denoting an end of the reference structure S20 that is closer to the object 20 and away from the target line Lo, as seen from above. FIG. 9 is a top view of the work site in a state where the object 20 shown in FIG. 8 is arranged along the target line Lo as seen from above.

In Example 2 shown in FIG. 9, the objects 20 and the reference structure S20 are arranged continuously to form a curve (or a substantially curve). Each of the objects 20 is arranged so that an outer section of the objects 20 forming the curve, i.e., a section away from a center of an arc which is defined to be a part of the curve, extends along the target line Lo. In Example 2, this arrangement is called a target line-outer section arrangement. In other words, the objects 20 are arranged inside the target line Lo denoted by the curve therealong. Hereinafter, a procedure sequence for the target line-outer section arrangement in Example 2 will be described. In Example 2, the difference from Example 1 will be mainly described.

As shown in FIG. 7, the guidance device 40 is attached to the object 20 in the same manner as Example 1. A worker selects a guidance mode by manipulating the manipulation part 63. Specifically, the worker selects a target line-outer section arrangement mode.

FIG. 9 shows a state where the reference structure S20 and the object 20 are adjacent to each other, i.e., a target state where the object 20 is at a target position. In the target state, an end at a corner of the object 20, among four corners thereof, which is away from the reference structure S20 and closer to the target line Lo in a plan view is defined as a point 20*c*. In the target state, an end at another corner of the object 20, among the four corners thereof, which is closer to the reference structure S20 and closer to the target line Lo in the plan view is defined as a point 20*a*. In the target state, an end at a corner of the object 20, among the four corners thereof, which is closer to the reference structure S20 and away from the target line Lo in the plan view is defined as a point 20*b*. In the target state, an end at a corner of the reference structure S20, among four corners thereof, which is closer to the object 20 and away from the target line Lo in the plan view is defined as a point S20*b*.

The controller 50 calculates, based on detection information D5 and object information D7, a coordinate of each of the point 20*a*, the point 20*b*, and the point 20*c* shown in FIG. 7. In Example 1, the controller 50 obtains the formula for the straight line Lbd shown in FIG. 4. In contrast, in Example 2, the point 20*a* and the point 20*c* are in contact (or substantially contact) with the target line Lo in the target state shown in FIG. 9. Therefore, a controller 50 does not need to obtain a formula for a straight line Lac connecting the point 20*a* and the point 20*c* to each other. However, the controller 50 may obtain the formula for the straight line Lac connecting the point 20*a* and the point 20*c* to each other.

First, positioning of the point 20*b* of the object 20 will be described.

In FIG. 7 and FIG. 8, an operator of the working machine 1 moves the object 20 so that the point 20*b* of the object 20 approaches a target position in the same manner as Example 1. Specifically, the target position is the point S20*b* of the reference structure S20.

Subsequently, positioning of the object 20 along the target line Lo will be described.

The operator instructs the controller 50 to start guidance operability by manipulating the manipulation part 63. For instance, the operator pushes down the guidance start button of the manipulation part 63. In response to this, the controller 50 performs various kinds of calculations. Specifically, the controller 50 calculates coordinates of a plurality of points on the target line Lo as target information D3 (target coordinate information). The controller 50 calculates a coordinate of the point 20*c* as detection information D5 (detection coordinate information). The controller 50 calculates, as a deviation D9, a shortest distance between the target line Lo and the coordinate of the point 20*c*. The controller 50 causes the display part 45 to display a moving direction of the object 20 which allows the deviation D9 to decrease in the same manner as Example 1.

The operator moves the object 20 in accordance with guidance. The operator preferably moves the object 20 so that the point 20*c* of the object 20 approaches the target line Lo in a state where the point 20*b* of the object 20 is in contact with the point S20*b* of the reference structure S20.

Example 3

In Example 3 of the embodiment, detection information is calculated, based on a direction of an object 20 to be conveyed.

The guidance system 30 may perform guidance, based on a yaw angle of the object 20, for the moving direction of the object 20. In Example 3, the difference from Example 1 will be mainly described.

First, positioning of a point 20*b* of the object 20 will be described.

In the same manner as Example 1, an operator of the working machine 1 moves the object 20 so that the point 20*b* of the object 20 shown in FIG. 4 approaches a target position. Specifically, the target position is a point S20*b* of the reference structure S20.

Subsequently, positioning of the object 20 along a target line L will be described.

The controller 50 calculates, based on the target line L, target information D3 (target yaw angle information). The controller 50 calculates information about a target direction of the object 20 in a plan view as the target information D3.

For instance, in the target line-inner section arrangement mode as shown in FIG. 6, the controller 50 defines a direction of the straight line Lbd which is in contact with the target line Li in the plan view as the target information D3 (target yaw angle information) (Example D1).

Moreover, for instance, in the target line-outer section arrangement mode as shown in FIG. 9, the point 20a and the point 20c of the object 20 are in contact with the target line Lo in the target state in the plan view. Therefore, the controller 50 defines a direction of the straight line Lac passing through the point 20a and the point 20c in the target state as the target information D3 (target yaw angle information) (Example D2).

Figure 10:
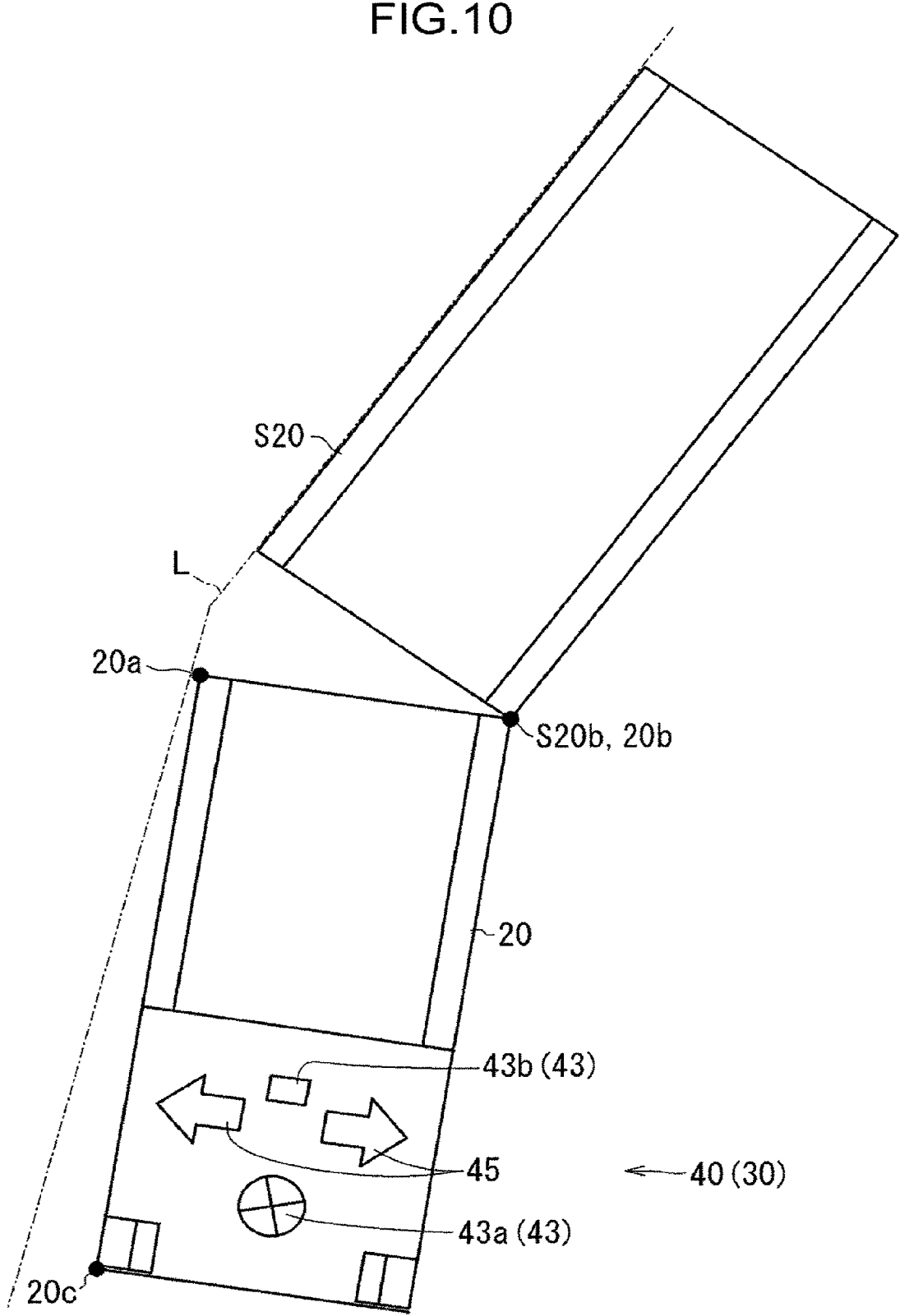
FIG. 10 is a top view of a work site before an object to be conveyed is arranged inside a target line denoted by a polyline in Example 3 of the embodiment as seen from above.

FIG. 10 is a top view of a work site before an object to be conveyed is arranged inside a target line L denoted by a polyline in Example 3 of the embodiment as seen from above.

For instance, as shown in FIG. 10, when the target line L is denoted by the polyline or the linear line, the controller 50 defines a direction in which the target line L extends as the target information D3 (target yaw angle information) (Example D3). The target line L extending in that direction includes a section which serves as a reference for the arrangement of the object 20 on the target line L and where the point 20a and the point 20c are in contact with the target line in the example shown in FIG. 10.

The controller 50 calculates information about a direction of the object 20 in the plan view as detection information D5. The controller 50 calculates, based on a yaw angle (detection yaw angle) of the object 20 detected by the detector 43, the detection information D5 (detection yaw angle information). The controller 50 calculates a deviation D9 of the detection yaw angle information from the target yaw angle information. The controller 50 causes the display part 45 to display a moving direction of the object 20 which allows the deviation D9 to decrease. The operator moves the object 20 in accordance with guidance. At this time, the operator rotationally moves the object 20 in accordance with the guidance.

In Example 3, guidance based on a coordinate is performed for positioning of the point 20b of the object 20 and the point S20b of the reference structure S20 shown in FIG. 10 to meet each other. Besides, guidance based on a yaw angle is performed so that a yaw angle of the detection information D5 about the object 20 and a yaw angle of the target information D3 agree with each other. As described above, the guidance system 30 may perform the guidance based on the coordinate and the guidance based on the yaw angle. Moreover, the guidance system 30 may perform the guidance based on the yaw angle concurrently with performing the guidance based on the coordinate. This configuration may individually provide a display part 45 for displaying a direction of a parallel movement of the object 20 for the guidance based on the coordinate and a display part 45 for displaying a direction of a rotational movement of the object 20 in a yaw direction for the guidance based on the yaw angle.

Next, a yaw angle association (calibration) will be described.

A coordinate system (sensor coordinate system) of a detection value of the detector 43 and a coordinate system (site coordinate system) of the target line L stored in the memory 52 occasionally disagree with each other. Specifically, a reference direction for a direction (detection yaw angle) detected by the detector 43 in the plan view of the object 20 and a reference direction for a direction in which the target line L extends in the plan view occasionally disagree with each other. More specifically, in a case where, for example, the sensor coordinate system has a reference in a direction defined when a power source of the detector 43 is turned on, and the site coordinate system has a reference in the north direction, the sensor coordinate system and the site coordinate system occasionally disagree with each other. Accordingly, the controller 50 executes a calibration process of associating the sensor coordinate system and the site coordinate system with each other.

Figure 11:
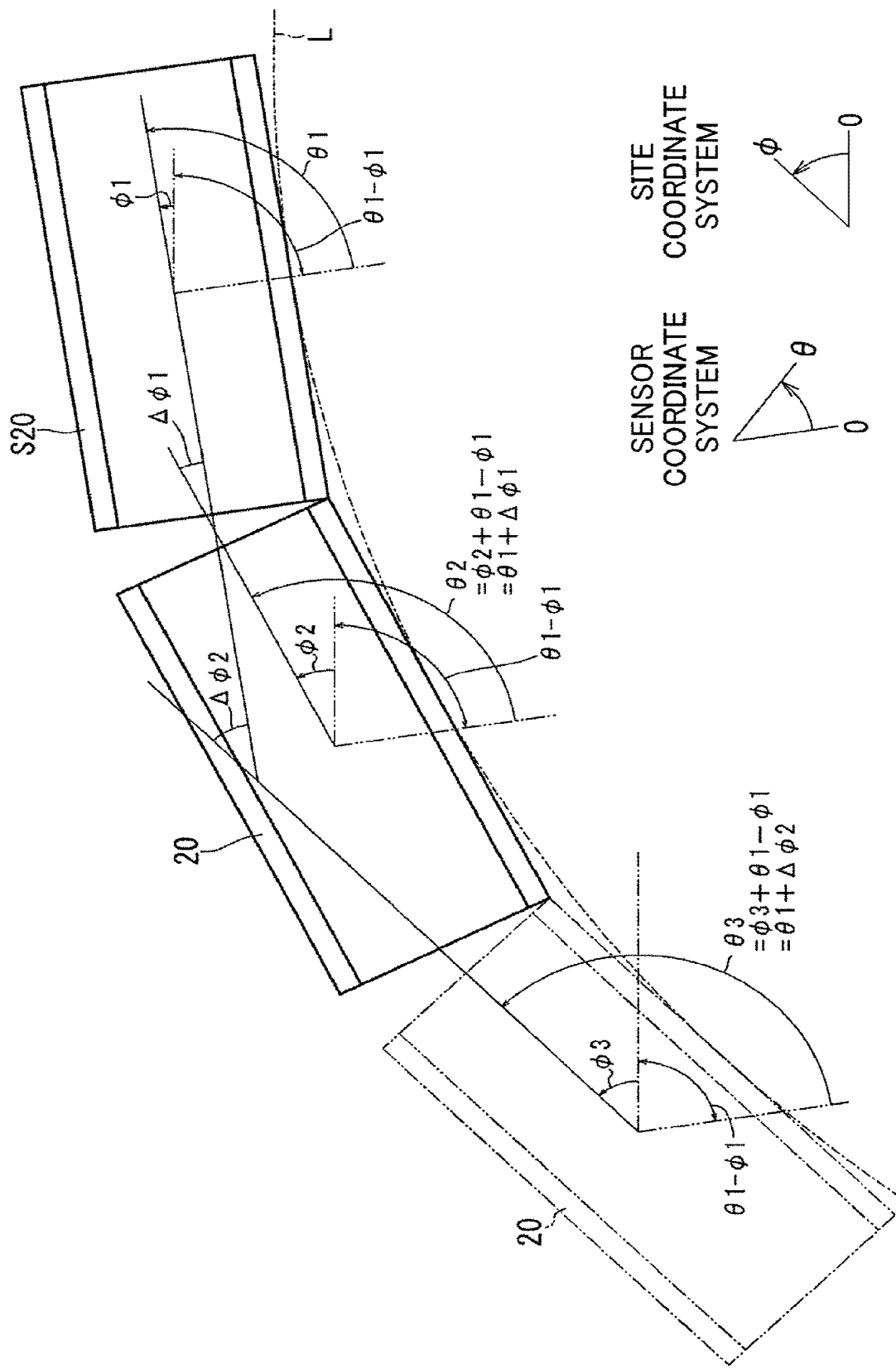
FIG. 11 is an explanatory view for a calibration process of associating a sensor coordinate system and a site coordinate system with each other.

FIG. 11 is an explanatory view for the calibration process of associating the sensor coordinate system and the site coordinate system with each other.

A reference yaw angle θ1 of the reference structure S20 shown in FIG. 11 is detected. The reference yaw angle θ1 defines a direction (yaw angle) of the reference structure S20 in the plan view, the direction being detected by the detector 43. More specifically, the guidance device 40 is attached to the reference structure S20. Then, the detector 43 detects a yaw angle of the reference structure S20. The yaw angle detected by the detector 43 at this time is defined as the reference yaw angle θ1.

The controller 50 causes the memory 52 to store (hold) the reference yaw angle θ1 defining the direction of the reference structure S20 in the plan view, the direction being detected by the detector 43. The controller 50 calculates, based on the reference yaw angle θ1 stored in the memory 52, at least one of the target information D3 and the detection information D5 about the object 20. Specifically, the controller 50 associates, based on the reference yaw angle θ1, the sensor coordinate system and the site coordinate system with each other. More specifically, the controller 50 associates the reference yaw angle θ1 in the sensor coordinate system and a yaw angle φ1 of the reference structure S20 in the site coordinate system with each other (connect or link the angles to each other). The yaw angle φ1 of the reference structure S20 in the site coordinate system represents a value stored in the memory 52 in advance. For instance, the controller 50 may calculate the yaw angle φ1 in a site coordinate system of the straight line Lbd passing through the point 20b and the point 20d of the reference structure S20 calculated based on coordinate information. The controller 50 may cause the memory 52 to store the yaw angle 91 of the reference structure S20 in the site coordinate system.

Examples 4 to 6 to be described below show guidance ways each utilizing the calibration process of associating the sensor coordinate system and the site coordinate system with each other.

Example 4

Example 4 in the embodiment shows a first guidance way utilizing an association between a yaw angle in a sensor coordinate system and a yaw angle in a site coordinate system of a reference structure S20.

In Example 4, calculation of target information based on a reference yaw angle θ1 and a detection yaw angle of an object 20 is executed in the following manner. Here, the reference structure S20 is arranged as a first object 20, and then a second object 20, a third object 20, and subsequent ones are continuously and sequentially arranged from the reference structure S20.

First, the controller 50 calculates a differential value (θ1−φ1) indicating a difference between a reference yaw angle θ1 (sensor coordinate system) and a yaw angle φ1 (site coordinate system) of the reference structure S20. Next, the controller 50 calculates, based on a target line L, a target yaw angle φ2 (site coordinate system) of the second object 20. Subsequently, the controller 50 calculates a target yaw angle θ2 (sensor coordinate system) which is a sum of the calculated target yaw angle φ2 (site coordinate system) and the differential value (θ1−φ1). Then, the controller 50 calculates a deviation D9 of the detection yaw angle (sensor coordinate system) representing detection information D5 about the second object 20 from the target yaw angle θ2 (sensor coordinate system) representing target information D3. The controller 50 causes the display part 45 to display a moving direction of the second object 20 which allows the deviation D9 to decrease. Here, the differential value is added to the target yaw angle φ2 (site coordinate system) as described above, but this disclosure is not limited thereto. The differential value may be subtracted from the target yaw angle φ2 (site coordinate system) depending on definition of a positive value and a negative value in a rotational direction (clockwise direction or counterclockwise direction) in the coordinate system.

Target information D3 is calculated for the third object 20 in the same manner as the calculation for the second object 20. Specifically, the controller 50 calculates, based on the target line L, a target yaw angle φ3 (site coordinate system) of the third object 20. Subsequently, the controller 50 calculates a target yaw angle θ3 (sensor coordinate system) which is a sum of the calculated target yaw angle φ3 (site coordinate system) and the differential value (θ1−φ1). Then, the controller 50 calculates a deviation D9 of a detection yaw angle (sensor coordinate system) representing detection information D5 about the third object 20 from the target yaw angle θ3 (sensor coordinate system) representing the target information D3. The controller 50 causes the display part 45 to display a moving direction of the third object 20 which allows the deviation D9 to decrease. Target information D3 is calculated for a fourth object 20 and subsequent ones in the same manner as described above.

Example 5

Example 5 in the embodiment shows a second guidance way utilizing an association between a yaw angle in a sensor coordinate system and a yaw angle in a site coordinate system of a reference structure S20.

In Example 5, calculation of target information based on a reference yaw angle θ1 and a detection yaw angle of an object 20 may be executed in the following manner.

First, the controller 50 calculates, based on a target line L, a target yaw angle φ2 (site coordinate system) of a second object 20. Next, the controller 50 calculates a difference Δφ1 (=φ2−φ1) between the calculated target yaw angle φ2 (site coordinate system) and a yaw angle φ1 (site coordinate system) of the reference structure S20. Subsequently, the controller 50 calculates a target yaw angle θ2 (sensor coordinate system) which is a sum of the difference Δφ1 and the reference yaw angle θ1. Then, the controller 50 calculates a deviation D9 of the detection yaw angle (sensor coordinate system) representing detection information D5 about the second object 20 from the target yaw angle θ2 (sensor coordinate system) representing target information D3. The controller 50 causes the display part 45 to display a moving direction of the second object 20 which allows the deviation D9 to decrease. Target information D3 is calculated for a third object 20 and subsequent ones in the same manner as described above.

In a case where a plurality of objects 20 is continuously arranged, a difference ΔφN between a target yaw angle φN of the N-th (here, "N" indicates an integer which is 2 or larger) object 20 and a target yaw angle of the N-1th object 20 is estimated to be a constant value. Specifically, for example, when the target line L is denoted by an arc and a couverture of the target line L is constant, or the target line L is denoted by a polyline and includes a bent section at a fixed angle, differences Δφ1, Δφ2, Δφ3 and subsequent differences increase by a constant value. More specifically, for instance, the differences Δφ1, Δφ2, Δφ3 and subsequent differences increase by 5°, i.e., 5°, 10°, 15° and the like. In this case, the controller 50 may calculate the target yaw angle φN of the N-th object 20 as the constant value×(N−1).

Example 6

Example 6 in the embodiment shows a third guidance way utilizing, for a coordinate calculation, an association between a yaw angle in a sensor coordinate system and a yaw angle in a site coordinate system of a reference structure S20.

The controller 50 may calculate a coordinate of a specific point of an object 20, based on a coordinate of a certain position (e.g., coordinate of the prism member 43a) associated with the object 20, a direction of the object 20, and object information D7. The direction of the object 20 includes a yaw angle of the object 20. The controller 50 may use, when calculating the yaw angle, the relation between the reference yaw angle θ1 (sensor coordinate system) and the yaw angle φ1 (site coordinate system) of the reference structure S20 shown in FIG. 11.

Specifically, for instance, the detector 43 detects a detection yaw angle, e.g., 02, (sensor coordinate system) of the object 20. The controller 50 calculates a differential value (θ1−φ1) from the reference yaw angle θ1 (sensor coordinate system) stored in the memory 52 and the yaw angle φ1 (site coordinate system) of the reference structure S20. Then, the controller 50 calculates a detection yaw angle, e.g., 92 in the site coordinate system of the object 20 by subtracting the differential value (θ1−φ1) from the detection yaw angle, e.g., θ2 (sensor coordinate system), of the object 20. The controller 50 calculates the coordinate of the specific point of the object 20, based on the detection yaw angle, e.g., φ2, in the site coordinate system.

The detailed calculation sequence in each of Examples 4 to 6 can be variously modified. Although a positive value is defined in the counterclockwise direction and a negative value is defined in the clockwise direction in the example shown in FIG. 11, the negative value may be defined in the counterclockwise direction and the positive value may be defined in the clockwise direction. Moreover, both the sensor coordinate system and the site coordinate system for each of the roll angle and the pitch angle shown in FIG. 3 are defined on a horizontal basis, and therefore coordinate conversion is unnecessary. However, when the sensor coordinate system and the site coordinate system for each of the roll angle and the pitch angle differ from each other, the sensor coordinate system and the site coordinate system may be associated with each other in the same manner as the association for the yaw angle.

Comparison between arrangement of the object 20 using the guidance system 30 and arrangement of the object 20 without using the guidance system 30 will be described below.

When the object 20 is arranged without using the guidance system 30, a stake is provided as an indication for the arrangement of the object 20. Then, the object 20 is arranged, aiming at the stake. However, there has been a demand in construction of a structure for arrangement of the structure with high accuracy and a smaller number of workers, specifically, for highly accurate arrangement of the object 20 without using the stake. Moreover, such guidance as to move the object 20 so that a specific point thereof reaches a target point without using the target line L makes it difficult to arrange the object 20 based on the target line L (e.g., along the target line L).

In contrast, the controller 50 in the guidance system 30 according to the embodiment automatically calculates, based on the information (target line information D1) related to the target line L as stored in advance, the target information, and achieves the guidance of allowing a difference between the target information D3 and the detection information D5 to decrease. Consequently, the object 20 is easily arrangeable based on the target line L.

Summary of Embodiment

The technical features of the embodiment will be summarized below.

A guidance system according to one aspect of the present invention includes: a detector which detects at least one of a coordinate of an object to be conveyed and a direction of the object: a controller which acquires the at least one of the coordinate of the object and the direction of the object detected by the detector; a display part; and a memory. The memory stores, in advance, target line information indicating an arrangement target of the object and related to a target line denoted by at least one of a curve and a polyline. The controller is configured to: calculate, based on the target line information, target information which is at least one of information about a target coordinate of the object and information about a target direction of the object; calculate, based on the at least one of the coordinate of the object and the direction of the object detected by the detector, detection information which is comparable with the target information; calculate a deviation of the detection information from the target information; and cause the display part to display a moving direction of the object which allows the deviation to decrease.

This configuration permits the controller to automatically calculate, based on the target line information related the target line, the target information about the object to be conveyed. Furthermore, the deviation of the detection information from the target information is calculated, and the display part displays the moving direction of the object which allows the calculated deviation to decrease. This consequently achieves guidance for the moving direction of the object along the target line with high accuracy. Moreover, the operator moves the object in the moving direction displayed on the display part, thereby attaining arrangement of the object along the target line with high accuracy.

The guidance system may further include a frame part attached to the object. The detector may be attached to the frame part.

According to this configuration, the detector is attached to the frame part which is attached to the object, and thus can detect the at least one of the coordinate of the object and the direction of the object with higher accuracy. Moreover, the attachment of the frame part to the object leads to a success in easy detection of the at least one of the coordinate of the object and the direction of the object.

The guidance system may further include an input part which inputs object information including a dimension of the object to the controller. The controller may be configured to: calculate the information about the target coordinate of the object as the target information; and calculate information about a coordinate of a specific point of the object as the detection information, based on the coordinate of the object detected by the detector, the direction of the object detected by the detector, and the object information input by the input part.

This configuration can specify the shape of the object from the dimension of the object, and achieves the guidance for the moving direction of the object so that the coordinate of the specific point of the object approaches the target line.

In the guidance system, the controller may be configured to: calculate information about the target direction of the object in a plan view as the target information; and calculate information about the direction of the object in the plan view as the detection information.

This configuration succeeds in the guidance for the moving direction of the object so that the detection direction of the object in the plan view approximates to the target direction of the object in the plan view. In this case, the controller does not need to calculate the coordinate of the object. Accordingly, this guidance can reduce a calculation amount of the controller more effectively than guidance based on the coordinate.

In the guidance system, an object arranged to let the target information and the detection information agree with each other in the detection of the at least one of the coordinate of the object and the direction of the object by the detector may be defined as a reference structure. The controller may be configured to: cause the memory to store a reference yaw angle defining a direction of the reference structure in the plan view, the direction being detected by the detector; and calculate, based on the reference yaw angle stored in the memory, at least one of the target information and the detection information about the object.

This configuration can reduce a labor of detecting the reference yaw angle per object to be conveyed. More specifically, in a case where the coordinate system of the detection yaw angle of the object and the coordinate system of the target line differ from each other, it is necessary to make one of the coordinate systems to agree with the other. In conveyance and arrangement of a plurality of objects, much labor is required to detect a reference value (reference yaw angle) per object for the agreement between the coordinate systems. Here, the reference yaw angle of the reference structure is stored in the memory, and the at least one of the target information and the detection information about the object is calculated, based on the reference yaw angle stored in the memory. This configuration can consequently reduce the labor of detecting the reference yaw angle per object.

In the guidance system, the controller may be configured to cause the memory to store arrangement information about the object when the target information and the detection information agree with each other.

After the arrangement of the object at the target position, the information about the object may be acquired through measurement with the aim of, for example, evidence or recordation management. Here, the memory stores the arrangement information about the object in the state where the target information and the detection information agree with each other. This accordingly eliminates the need for actually measuring the arranged object by the worker, and achieves easy acquisition of the information about the object.

In the guidance system, the arrangement information may include the coordinate of the object detected by the detector, the direction of the object detected by the detector, and the object information including the dimension of the object.

This configuration enables a wide variety of utilization of the arrangement information. For instance, a coordinate of a certain point of the object is calculatable from the arrangement information. The calculated coordinate of the certain point of the object is stored in the memory, resulting in eliminating the need for independent measurement by the worker with the aim of the evidence or recordation management. Accordingly, the number of steps is reducible.

The guidance system may further include a notification part. The controller may cause the notification part to output a warning when a coordinate of a certain point of the object shifts over the target line from one position to another position in the plan view.

This configuration can suppress deviation of the object from the target line in the arrangement thereof.

The embodiment described above may be modified in various ways. The arrangement or the shape of each structural element may be changed. For instance, the connection between or among the structural elements shown in FIG. 3 and other drawings may be changed. For example, the steps or processes (including calculation) may be executed by the controller 50 in the above-described order or in a different order therefrom. For instance, the number of structural elements may be changed, and the structural elements are partly excludable. For example, the structural elements are described as members different from one another or a part of the structure, but may cover a single member or a part of a specific member. For example, the structural element described as a single member or a part of a specific member may cover a plurality of members or parts different from one another.

The invention claimed is:

1. A guidance system, comprising:
   a detector which detects at least one of a coordinate of an object to be conveyed and a direction of the object;
   a controller which acquires the at least one of the coordinate of the object and the direction of the object detected by the detector;
   a display; and
   a memory, wherein
   the memory stores, in advance, target line information indicating an arrangement target of the object and related to a target line denoted by at least one of a curve and a polyline, and
   the controller is configured to:
   calculate, based on the target line information, target information which is at least one of information about a target coordinate of the object and information about a target direction of the object;
   calculate, based on the at least one of the coordinate of the object and the direction of the object detected by the detector, detection information which is comparable with the target information;
   calculate a deviation of the detection information from the target information; and
   cause the display to display a moving direction of the object which allows the deviation to decrease.

2. The guidance system according to claim 1, further comprising a frame attached to the object, wherein the detector is attached to the frame.

3. The guidance system according to claim 1, further comprising an input device which inputs object information including a dimension of the object to the controller, wherein the controller is configured to:
   calculate the information about the target coordinate of the object as the target information; and
   calculate information about a coordinate of a specific point of the object as the detection information, based on the coordinate of the object detected by the detector, the direction of the object detected by the detector, and the object information input by the input device.

4. The guidance system according to claim 1, wherein the controller is configured to:
   calculate information about the target direction of the object in a plan view as the target information; and
   calculate information about the direction of the object in the plan view as the detection information.

5. The guidance system according to claim 4, wherein
   an object arranged to let the target information and the detection information agree with each other in the detection of the at least one of the coordinate of the object and the direction of the object by the detector is defined as a reference structure; and
   the controller is configured to:
   cause the memory to store a reference yaw angle defining a direction of the reference structure in the plan view, the direction of the reference structure being detected by the detector; and
   calculate, based on the reference yaw angle stored in the memory, at least one of the target information and the detection information about the object.

6. The guidance system according to claim 1, wherein the controller is configured to cause the memory to store arrangement information about the object when the target information and the detection information agree with each other.

7. The guidance system according to claim 6, wherein the arrangement information includes the coordinate of the object detected by the detector, the direction of the object detected by the detector, and an object information including a dimension of the object.

8. The guidance system according to claim 1, further comprising notification circuitry, wherein the controller causes the notification circuitry to output a warning when a coordinate of a certain point of the object shifts over the target line from one position to another position in a plan view.

* * * * *